Oct. 25, 1960
D. R. PIERCE
2,957,352
GEAR SHIFT AND THROTTLE CONTROL
Filed July 13, 1959
2 Sheets-Sheet 1
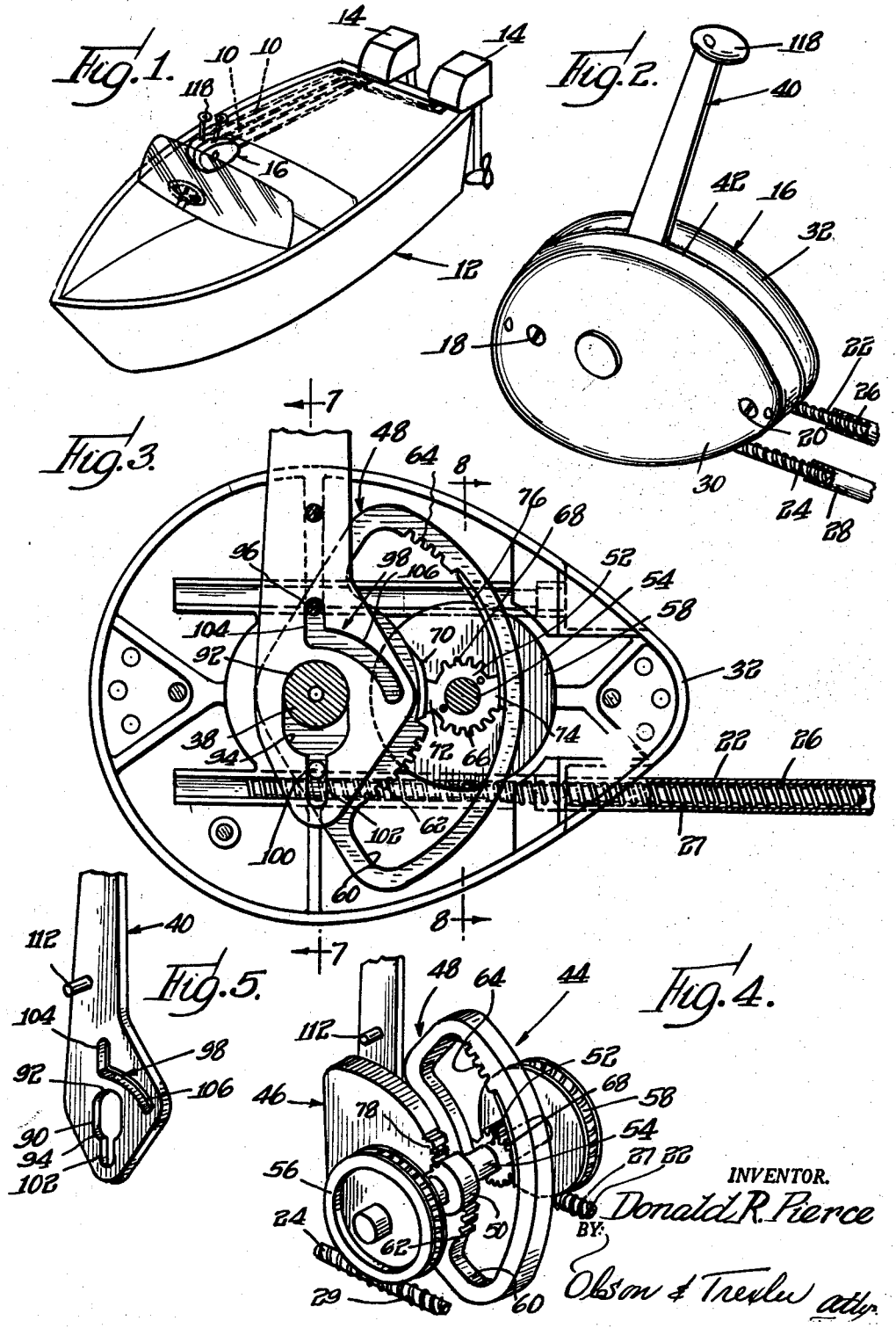
INVENTOR.
Donald R. Pierce
BY
Olson & Trexler atty.

Oct. 25, 1960   D. R. PIERCE   2,957,352
GEAR SHIFT AND THROTTLE CONTROL
Filed July 13, 1959   2 Sheets-Sheet 2
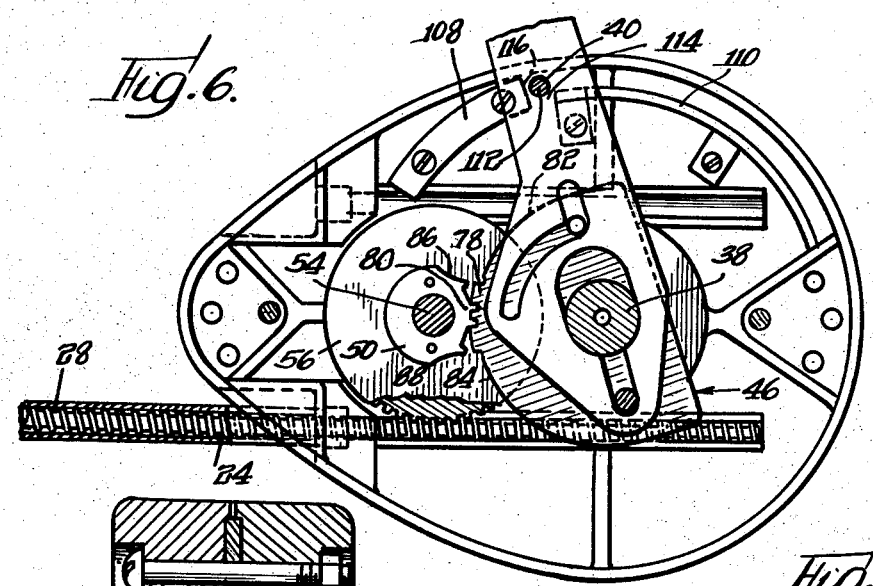
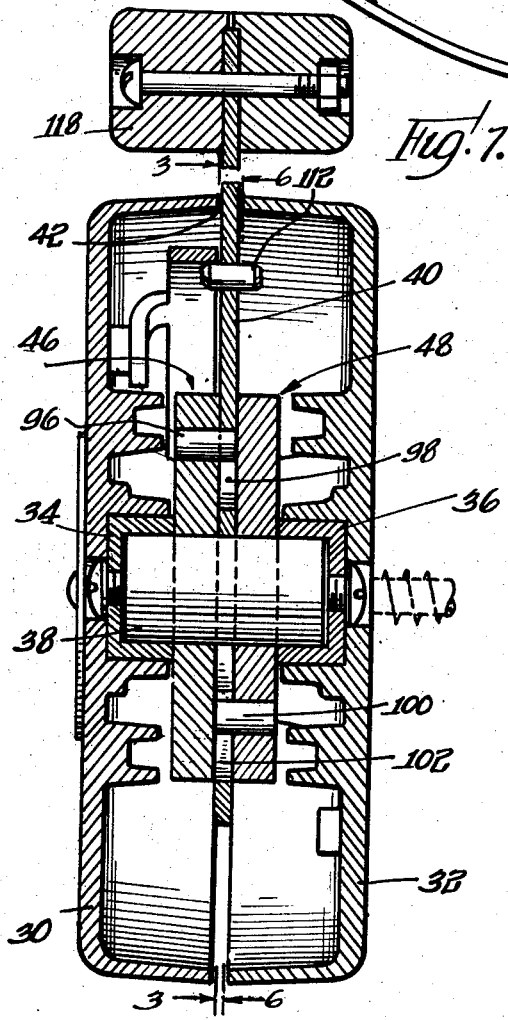
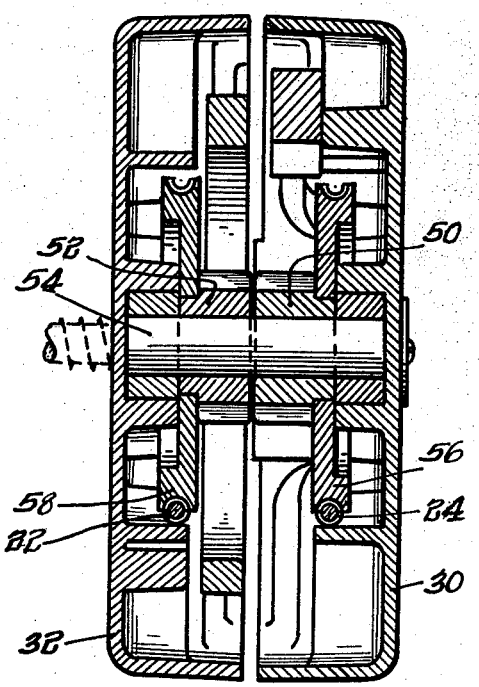
INVENTOR.
Donald R. Pierce
BY
Olson & Trexler attys

United States Patent Office 2,957,352
Patented Oct. 25, 1960

2,957,352

GEAR SHIFT AND THROTTLE CONTROL

Donald R. Pierce, Ambler, Pa., assignor to Teleflex Incorporated, North Wales, Pa., a corporation of Delaware Filed July 13, 1959, Ser. No. 826,704

13 Claims. (Cl. 74—472)

The present invention relates to a novel control mechanism, and more particularly to a novel gear shift and throttle control apparatus especially suitable for marine engines and the like.

Controls for shifting the gears and operating the throttle of marine engines or outboard motors include, in many instances, one actuating lever and associated elements for operating the gear shift mechanism and another separate actuating lever and associated elements for operating the throttle. It will be appreciated that such an apparatus enables the gear shift mechanism and throttle to be operated separately from each other on occasions when such separate operation is desirable such, for example, as during engine warm-up. However, the operation of separate levers in a proper, smooth and efficient manner frequently requires considerable skill such, for example when the operator is attempting to maneuver the boat in a crowded or restricted waterway. In an attempt to promote easy and therefore safer operation of boats it has been suggested that control mechanisms be provided which utilize a single lever for operating both the gear shift mechanism and the throttle in a manner which still enables the operator to actuate the throttle independently of the gear shift mechanism when desired. While certain of such single lever devices have been satisfactory in many respects, they have frequently been relatively complicated and expensive to manufacture and maintain.

It is an important object of the present invention to provide a novel single lever gear shift and throttle control apparatus of simplified and enduring construction whereby manufacturing, installation and maintenance cost may be substantially reduced.

A more specific object of the present invention is to provide a novel single lever gear shift and throttle control mechanism which includes simplified and easily operable means whereby the throttle may be actuated without operating the gear shift whenever desired.

A further object of the present invention is to provide a novel single lever gear shift and throttle control unit which is constructed so that a pair of the units may be easily mounted in side-by-side relationship for controlling twin motor installations.

Other objects and advantages of the present invention will become apparent from the following description and the accompanying drawings wherein:

Fig. 1 is a simplified perspective view showing a boat incorporating control apparatus constructed in accordance with features of the present invention;

Fig. 2 is an enlarged perspective view showing a unit of the present invention;

Fig. 3 is a sectional view taken generally along the line 3—3 in Fig. 7;

Fig. 4 is a fragmentary perspective view having parts out of proportion for more clearly showing the operating elements of a unit incorporating features of the present invention;

Fig. 5 is a fragmentary perspective view of the actuating lever of a control apparatus of the present invention;

Fig. 6 is a sectional view taken generally along line 6—6 in Fig. 7 but shows the operating elements shifted to a neutral position;

Fig. 7 is a sectional view taken generally along line 7—7 of Fig. 3; and

Fig. 8 is a sectional view taken generally along line 8—8 in Fig. 3.

Referring now more specifically to the drawings wherein like parts are designated by the same numerals throughout the various figures, a control apparatus 10 incorporating features of the present invention is shown in simplified form in Fig. 1 installed in a boat 12. In fact Fig. 1 shows the manner in which a pair of control systems 10 may be installed in adjacent relationship for controlling twin motors 14 mounted on the boat. However, it is understood that the control mechanisms 10 operate independently of each other and may be used singly where only a single engine is installed.

The apparatus 10 comprises a unit 16 which may be easily mounted by means of screws 18 and 20 at any convenient location in the boat. The unit 16 is connected with and adapted to actuate in the manner described in detail below cables 22 and 24 respectively extending through guide conduits 26 and 28 and connected with the throttle and gear shift actuating elements, not shown, of the motor. While the cables 22 and 24 may be of various known constructions, they are preferably provided with axially spaced tooth elements along their peripheries for cooperative engagement with actuating gears which will be described below. In the embodiment illustrated, these tooth elements are provided by outermost wires 27 and 29 of the cables 22 and 24 which are helically wound with spaced coils.

The unit 16 comprises a housing made up of complementary members 30 and 32 which are detachably secured together by means of screws or the like. As shown in Fig. 7, the housing members are provided with opposing recesses or pockets for accommodating bearing inserts 34 and 36 respectively which are adapted rotatably to support a main shaft 38. An actuating lever 40 is mounted on the shaft 38 in the manner described in detail below and extends upwardly through a slot 42 in the housing. The actuating lever is adapted to be manipulated for operating a drive mechanism 44 shown in Fig. 4 which in turn actuates the cables 22 and 24.

The drive mechanism 44 comprises a first gear sector 46 freely pivotally mounted on the main shaft 38 and a second gear sector 48 also freely pivotally mounted on the main shaft. These gear sectors are respectively adapted to actuate gears 50 and 52 which are freely rotatably mounted on a second shaft 54 shown in Figs. 3, 4, 6 and 8. As shown best in Fig. 8, the gears 50 and 52 respectively support and drive worm-type gears 56 and 58 which mesh with the cables 24 and 22.

Referring particularly to Figs. 3 and 4, it is seen that the gear sector 48 comprises an arcuate slot 60 having radially outwardly projecting or external teeth 62 adjacent one end of the slot and internal teeth 64 adjacent the opposite end of the slot. The gear member 52 is disposed within the slot and is provided with a first tooth segment 66 cooperable with the teeth 62 and a second tooth segment 68 cooperable with the internal teeth 64 when the gear sector 48 is manipulated in the manner described below. The radial inner margin of the slot also comprises an arcuate locking surface 70 cooperable with a lug 72 on the gear member 52 and having a complementary locking surface. Another locking lug 74 is disposed on the gear element 52 oppositely from the lug 72 and is provided with an arcuate end or locking surface cooperable with an inwardly facing arcuate locking surface 76 which defines a portion of the radially outwardly disposed margin of the slot 60. When the gear sector 48 and the gear element 52 are in the position shown in Fig. 3 it is seen that the locking lugs are in engagement with the locking surfaces 70 and 76 so that the gear 52 is locked against rotation. As a result the worm gear 58 and the actuating cable 22 are also locked against movement so that the engine throttle is fixed in an idling position.

The gear sector 46 which is shown best in Figs. 4 and 6, has a relatively short arcuate tooth segment 78 cooperable with a complementary tooth segment 80 on the gear element 50. Arcuate locking surfaces 82 and 84 are formed on the sector 46 at opposite sides of the tooth segment 78 for cooperating with complementary concave locking surfaces 86 and 88 respectively on the gear element 50. With this arrangement the gear element 50 may be selectively rotated in opposite directions from the neutral position shown in Fig. 6 for manipulating the gear shift mechanism of the engine either into forward or reverse positions. The cooperable locking surfaces of the sector 46 and the gear element 50 then serve to lock the gear element 50 in the desired position until it is again shiftd toward neutral.

As indicated hereinabove, it is often desirable to manipulate the throttle control of the engine without operating the gear shift mechanism. In accordance with a feature of the present invention this result may be accomplished by means of the simple and efficient structure now to be described. Referring particularly to Figs. 3, 5 and 6, it is seen that the actuating lever 40 has an elongated slot 90 adjacent to its inner end through which the main shaft 38 extends. The width of the slot 90 is similar to the diameter of the shaft 38 but the length of the slot is substantially greater than the shaft diameter so that the lever 40 may be shifted axially of its length and radially of the shaft 38 between the inner or retracted position shown in Fig. 3 and the outer or extended position shown in Fig. 6. Opposite end surfaces 92 and 94 of the slot 90 are semicircular in configuration and have a radius similar to but slightly greater than the radius of the shaft 38 so that the lever may be pivoted smoothly around the shaft when the lever is in either the extended or retracted position.

In order to provide a driving connection between the actuating lever 40 and the gear sector 46, a pin 96 is fixed to the gear sector and extends into a slot 98 formed in the actuating lever. Similarly a pin 100 fixed to the gear sector 48 provides a driving connection between this gear sector and the actuating lever by extending into a slot 102 in the actuating lever. It is to be noted that the slot 98 includes an elongated end portion 104 which extends generally axially of the actuating lever 40. It is also important to note that the relatively wide slot 90 which accommodates the main shaft 38, the slot 102 which has a width similar to the diameter of the drive pin 100 and the slot portion 104 have a common longitudinal axis. Thus, the pins 96 and 100 are accomodated by the slot portion 104 and the slot 102 to permit the actuating lever to be axially bodily shifted to and from the previously described extended and retracted positions. When the actuating lever is in the retracted position as shown in Fig. 3, the pins 96 and 100 are in engagement with the side edges of the slot portion 104 and the slot 102 respectively so that when an operator pivots the lever around the shaft 38, the pivotal movement will be imparted to the gear sectors 46 and 48 through the connection provided by the drive pins 96 and 100.

The slot 98 includes an arcuate portion 106 merging with the radially inner end of the slot portion 104 and having a center of curvature concentric with the arc of the end surface 94 of the slot 90. With this arrangement the driving connection between the actuating lever and the pin 96 and thus the gear shift actuating sector 46 may be broken by axially shifting the lever to the radially extended position shown in Fig. 6. It will be noted that when the lever is in the extended position the pin 96 enters the arcuate slot portion 106 so that upon forward rotation of the lever the pin 96, in effect, moves within the arcuate slot portion 106 so that the gear sector 46 remains stationary. However, when the lever is in the radially extended position, the driving connection between the sector 48 and the lever provided by the pin 100 remains since the pin 100 is still in engagement with the side edges of the slot 102. Thus, the throttle of the engine may be manipulated independently of the gear shift mechanism when the lever 40 is in the position shown in Fig. 6.

It will be noted that the construction and arrangement of the gear sectors 46 and 48 is such that when the actuating lever is in the radially inner or retrated position and is pivoted about the shaft 38 either forwardly or reversely, the gear sector 46 will function to rotate the gear element 50 to and lock the gear element 50 in either a forward or reverse position prior to any substantial turning of the gear element 52 for actuating the engine throttle. Furthermore, whenever the actuating lever 40 is rotated between forward and reverse positions, the engine throttle is returned to and locked in an idling position prior to and during manipulation of the gear shift mechanism. In other words, the structure is such that during normal operation the gear shift mechanism of the engine cannot be changed until the engine is first returned substantially to idling speed. It is important to note that means is provided whereby this same result is accomplished when the actuating lever is moved to its radially extended position for operating the throttle without shifting the gears of the engine.

Referring particularly to Figs. 6 and 7, it is seen that arcuate cam members 108 and 110 are mounted in the housing and disposed around the main shaft 38. A pin 112 is fixed to the actuating lever 40 for cooperative engagement with the cam members 108 and 110. As shown in Fig. 6, a gap 114 is provided between ends of the cam members 108 and 110, through which gap the pin 112 may pass when the actuating lever 40 is in a neutral position or in other words in a position in which the gear shift mechanism of the engine is in neutral and the throttle of the engine is in an idling position. Thus, when the actuating lever 40 is in the neutral position shown in Fig. 6 it may be freely moved between its radially extended and retracted positions without interference between the pin 112 and the cam members 108 and 110. The inner surfaces of these cam members are disposed for engaging the pin 112 and preventing the actuating lever from being shifted radially outwardly whenever the lever is either forwardly or rearwardly of the neutral position. The outer surface of the cam member 110 is disposed for passing beneath the pin 112 when the actuating lever is advanced from the neutral and radially extended position, shown in Fig. 6, so as to enable the throttle of the engine to be manipulated while at the same time eliminating any possibility of movement of the actuating lever inwardly to its retracted position until it has been rotated back to the neutral position shown in Fig. 6. Preferably the cam member 108 is constructed so that an end 116 thereof provides a stop which positively locates the lever in the neutral and radially axially extended position so as to facilitate return of the lever to the radially retracted position.

While the manner in which the apparatus described above is believed to be clear, a brief resume of the operation of the control system is as follows. With the lever 40 rotated to the neutral position which, in the embodiment illustrated, is inclined rearwardly slightly from the vertical as shown in Fig. 6, the operator may proceed to start the engine. If desired, the lever may be pulled outwardly to its axially or radially extended position and then advanced slightly to facilitate starting of the motor and also subsequent warm-up of the motor.

Then the lever 40 is pivoted rearwardly until the pin 112 engages the stop 116 whereupon the lever is shifted axially or radially inwardly. Then the operator may either actuate the gear shift mechanism of the engine to the forward or reverse position by pivoting the lever 40 in the appropriate direction. When a twin engine installation is used as shown generally in Fig. 1, the operator may actuate the control levers 40 of both units 16 simultaneously. Such operation is facilitated by the generally flattened compact overall configuration of the unit 16 which enables the housings of the two units to be mounted together in abutting relationship for locating the levers in close proximity to each other. Such simultaneous operation is further facilitated by providing hand knobs 118 at the outer ends of the levers which knobs have a width similar to but slightly less than the width of the housings of the unit 16. It is understood, of course, that the dual units 16 of the twin engine installation may be operated separately from each other if desired.

While the preferred embodiment of the present invention has been shown and described herein, it is obvious that many structural details may be changed without departing from the spirit and scope of the appended claims.

The invention is claimed as follows:

1. An apparatus of the type described for controlling an engine throttle and a gear shift mechanism associated with the engine comprising an actuating member mounted for selective pivotal movement around first and second spaced apart parallel axes, first operating means connectable with an engine throttle, means providing a driving connection between said actuating member and said first operating means when said actuating member is pivoted about said first axis and also when said actuating member is pivoted about said second axis, second operating means connectable with an engine gear shift mechanism, and means for providing a driving connection between said actuating member and said second operating means when said actuating member is pivoted about said first axis and for disconnecting the actuating member from said second operating means when the actuating member is pivoted about said second axis.

2. An apparatus, as defined in claim 1, wherein said actuating member is pivotal about said first axis forwardly and rearwardly from a neutral position, said apparatus including means mounting said actuating member for movement transversely of said axes to and from radially retracted and extended positions when said actuating membem is in said neutral position, said actuating member being pivotal about said first axis when it is in said radially retracted position and being pivotal about said second axis when it is in said radially extended position.

3. An apparatus, as defined in claim 2, which includes means for restraining said actuating member against movement between said radially extended and retracted positions when the actuating member is out of said neutral position.

4. An apparatus, as defined in claim 1, wherein at least one of said operating means comprises a toothed member disposed adjacent said actuating member and mounted for pivotal movement about an axis parallel to said first mentioned axes, and wherein the drive means associated with said one operating means comprises a pin element fixed to one of said members and slot means in the other of said members and receiving said pin element, said slot means being elongated in a direction traversing said parallel axes.

5. A control apparatus of the type described comprising shaft means, an actuating member on said shaft means, said actuating member having an elongated slot therein through which said shaft means extends for pivotally supporting the actuating member for movement to and from a predetermined location and also for supporting the actuating member for movement between radially extended and retracted positions, first operating means connectable with a first element to be controlled, means providing a driving connection between said actuating member and said first operating means when said actuating member is in any of said positions, second operating means connectable with a second element to be controlled, and additional means for providing a driving connection between said actuating member and said second operating means when said actuating member is in one of said positions and for disconnecting said actuating member and said second operating means when said actuating member is in the other of said positions.

6. An apparatus, as defined in claim 5, wherein one of said operating means comprises a member pivotally mounted on said shaft means adjacent said actuating member, and wherein said drive means associated with said one operating means comprises elongated slot means in one of said members and extending radially with respect to said shaft means, and a pin fixed to the other of said members and extending into said slot means.

7. An apparatus, as defined in claim 6, wherein said one operating means is said first operating means, the radial extent of said slot means being equal to the distance between the radially extended and retracted positions of said actuating member for accommodating the pin when the actuating member is moved between said positions.

8. An apparatus, as defined in claim 6, wherein said one operating means is said second operating means, and wherein said slot means has a lateral opening adjacent one end thereof through which said pin may pass for disconnecting said actuating member from said second operating means.

9. A control apparatus of the type described, comprising a shaft having a predetermined diameter, an actuating member having an elongated slot therethrough having a width similar to said diameter and a length substantially greater than said diameter, said shaft extending through said slot and supporting said actuating member for pivotal movement to and from a neutral position and also for radial movement toward and from radially extended and retracted positions, first operating means connectable with a first element to be controlled and including a first operating member pivotally supported by said shaft adjacent said actuating member, means providing a driving connection between said actuating member and said first operating member when said actuating member is in said radially retracted position and also when the actuating member is in said radially extended position, second operating means connectable with a second element to be controlled and including a second operating member pivotally supported by said shaft adjacent said actuating member, and means for providing a driving connection between said actuating member and said second operating member when said actuating member is in one of said positions and for disconnecting said actuating member and said second operating member when said actuating member is in the other of said positions.

10. An apparatus, as defined in claim 9, wherein said drive means between said actuating member and said first operating member comprises elongated slot means in one of said last mentioned members and having its major axis extending in the same direction as said slot in the actuating member, and a projecting element fixed with respect to the other of said last mentioned members and extending into said slot means, said slot means having a length similar to the length of movement of the actuating member to and from said radially extended and retracted positions.

11. An apparatus, as defined in claim 10, wherein the drive means between said actuating member and said second operating member comprises additional slot means in one of said last mentioned members and having an elongated portion extending in the same direction as said first mentioned slot means and also having a lateral opening adjacent one end thereof, and another projecting element fixed with respect to one of said last mentioned members and projecting into said last mentioned slot means, said last mentioned projecting element being able to pass through said lateral opening in said last mentioned slot means for disconnecting the second operating member from said actuating member.

12. An apparatus, as defined in claim 11, which includes means for preventing movement of said actuating member to and from said radially extended and retracted positions when said actuating member is out of said neutral location.

13. A control apparatus of the type described comprising relatively narrow housing means including opposite substantially flat sides and an elongated slot in an upper margin, a shaft mounted between said opposite sides, an actuating lever on said shaft and extending upwardly through said slot, said lever having elongated slot means through an inner end portion thereof through which said shaft extends for enabling pivotal movement of the lever around the shaft to and from a neutral location and also for enabling radial movement of the lever with respect to the shaft to and from radially extended and retracted positions, first operating means within said housing means connectable with a first element to be controlled and including a first gear sector freely pivotally mounted on said shaft, said lever having second elongated slot means therein extending in the same direction as said first mentioned slot means, a drive pin extending from said gear sector into said second slot means, second operating means within said housing means and connectable with a second element to be controlled and including a second gear sector freely pivotally mounted on said shaft, third slot means in said lever and including a portion extending in said direction and an arcuate portion, and a second drive pin extending from said second gear sector and into said third slot means for providing a driving connection between said lever and said second gear sector when the lever is in one of said positions and for disconnecting the lever and said second gear sector when the lever is in the other of said positions.

References Cited in the file of this patent
UNITED STATES PATENTS

| | | |
|---|---|---|
| 2,552,001 | Dugas | May 8, 1951 |
| 2,588,650 | Morse | Mar. 11, 1952 |
| 2,759,578 | Manzolillo | Aug. 21, 1956 |
| 2,867,131 | Schroeder | Jan. 6, 1956 |